US012179944B2

(12) United States Patent
Jung et al.

(10) Patent No.: US 12,179,944 B2
(45) Date of Patent: Dec. 31, 2024

(54) APPARATUS AND METHOD FOR SIMULATING SATELLITE MISSION OPERATING STATE

(71) Applicant: KOREA AEROSPACE RESEARCH INSTITUTE, Daejeon (KR)

(72) Inventors: Ok Chul Jung, Daejeon (KR); Jae Dong Seong, Daejeon (KR); Dea Won Chung, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 944 days.

(21) Appl. No.: 17/275,372

(22) PCT Filed: Apr. 4, 2019

(86) PCT No.: PCT/KR2019/003973
§ 371 (c)(1),
(2) Date: Mar. 11, 2021

(87) PCT Pub. No.: WO2020/059992
PCT Pub. Date: Mar. 26, 2020

(65) Prior Publication Data
US 2022/0055776 A1    Feb. 24, 2022

(30) Foreign Application Priority Data
Sep. 20, 2018    (KR) .................. 10-2018-0112721

(51) Int. Cl.
B64G 3/00    (2006.01)
B64G 1/24    (2006.01)
B64G 7/00    (2006.01)
(52) U.S. Cl.
CPC ............... B64G 7/00 (2013.01); B64G 1/242 (2013.01); B64G 3/00 (2013.01)

(58) Field of Classification Search
CPC ................ B09B 9/00; B64G 7/00; B64G 3/00
See application file for complete search history.

(56) References Cited

U.S. PATENT DOCUMENTS 5,506,780 A    4/1996  Montenbruck et al.
5,987,363 A *  11/1999  Quan .................. B64G 1/242
                                         701/13
(Continued)

FOREIGN PATENT DOCUMENTS

CN    102830951 B *  11/2015
JP    2007-157106 A    6/2007
(Continued)

OTHER PUBLICATIONS

CN-102830951-B Machine translation.*

Primary Examiner — Dino Kujundzic
(74) Attorney, Agent, or Firm — Rabin & Berdo, P.C.

(57) ABSTRACT

The present invention relates to an apparatus and a method for simulating a satellite mission operating state. The apparatus, according to the present invention, comprises: a satellite operation procedure rule definition unit for registering a satellite operation procedure rule which defines a satellite operation procedure keyword and attribute corresponding to a satellite's state of performing a mission of interest; a satellite operation procedure processing unit for receiving a satellite operation procedure which includes a series of operation procedures prepared for the satellite to perform the mission, and extracting, from the received satellite operation procedure, a keyword and attribute value corresponding to the keyword and attribute included in the registered satellite operation procedure rule a mission list storage unit for storing a list of mission performance actions arranged in the order of execution time, wherein the mission performance actions correspond to the extracted keyword and attribute value; an orbit data storage unit for storing orbit (Continued)

data of the satellite; a time management unit for providing a current time; and a control unit for confirming an orbit and the mission performance action corresponding to the current time from the orbit data of the satellite and the mission list, and causing the satellite's state of performing the mission of interest to be visually displayed.

6 Claims, 3 Drawing Sheets

(56) References Cited

U.S. PATENT DOCUMENTS

| | | | | |
|---|---|---|---|---|
| 6,048,366 | A * | 4/2000 | Ellis | H04B 7/18519 |
| | | | | 703/22 |
| 7,693,702 | B1 * | 4/2010 | Kerner | G06T 19/006 |
| | | | | 703/22 |
| 7,991,518 | B2 * | 8/2011 | Kim | B64G 1/24 |
| | | | | 701/13 |
| 10,853,410 | B2 * | 12/2020 | Herz | G06Q 30/0643 |
| 2007/0129922 | A1 * | 6/2007 | Lee | B64G 1/244 |
| | | | | 703/13 |
| 2012/0158216 | A1 * | 6/2012 | Kim | H04B 7/18519 |
| | | | | 701/3 |
| 2018/0268605 | A1 * | 9/2018 | Jia | G06T 1/20 |
| 2018/0314775 | A1 * | 11/2018 | Lee | G01S 19/23 |

FOREIGN PATENT DOCUMENTS

| | | |
|---|---|---|
| JP | 2007-261554 A | 10/2007 |
| KR | 10-1999-0040326 A | 6/1999 |
| KR | 10-2003-0056471 A | 7/2003 |
| KR | 10-2009-0066623 A | 6/2009 |
| KR | 10-2012-0061588 A | 6/2012 |
| KR | 10-2016-0074166 A | 6/2016 |

* cited by examiner

APPARATUS AND METHOD FOR SIMULATING SATELLITE MISSION OPERATING STATE

TECHNICAL FIELD

The present invention relates to an apparatus and a method for simulating a satellite mission operating state, and more particularly, to an apparatus and a method for simulating satellite mission operating state, which display a state of an artificial satellite performing a mission in three dimensions in real time or non-real time basis.

BACKGROUND ART

In the related artificial development and operation stage of a satellite, there is a need for a software or hardware simulator for simulating the satellite. However, the range of simulation by the related simulator is determined according to the components of and the degree of modeling the simulator, and it takes considerable costs to build the simulator in order to properly simulate the satellite state.

Meanwhile, since the related simulators focus on modeling the internal operation state or processing of the satellite for the purpose of analyzing response characteristics to a command, abnormal states, and the like, it is inefficient to use the simulator for the purpose of checking the major mission operating state.

SUMMARY

Technical Problem

Accordingly, it is an object of the present invention to provide an apparatus and a method for simulating a satellite mission operating state, which display a mission operating state of an artificial satellite in three dimensions in real time or non-real time basis.

Technical Solution

In order to accomplish the technical objectives mentioned above, an apparatus for simulating a satellite mission operating state according to the present invention includes: a satellite operation procedure rule definition unit for registering a satellite operation procedure rule which defines a satellite operation procedure keyword and attribute corresponding to a satellite's state of performing a mission of interest; a satellite operation procedure processing unit for receiving a satellite operation procedure which includes a series of operation procedures prepared for the satellite to perform the mission, and extracting, from the received satellite operation procedure, a keyword and attribute value corresponding to the keyword and attribute included in the registered satellite operation procedure rule; a mission list storage unit for storing a list of mission performance actions arranged in the order of execution time, in which the mission performance actions correspond to the extracted keyword and attribute value; an orbit data storage unit for storing orbit data of the satellite; a time management unit for providing a current time; and a control unit for confirming an orbit and the mission performance action corresponding to the current time from the orbit data of the satellite and the mission list, and causing the satellite's state of performing the mission of interest to be visually displayed.

The apparatus may further include: a satellite command rule definition unit for registering a satellite command rule which may define a satellite command keyword and attribute corresponding to the satellite's state of performing the mission of interest; and a satellite command processing unit for receiving a command corresponding to mission performance of the satellite, and extracting, from the received command, a keyword and attribute value corresponding to the keyword and attribute included in the registered satellite command rule.

The satellite operation procedure keyword may be an ASCII code, and the satellite command keyword may be an HEXA code.

In order to accomplish the technical objectives mentioned above, a method for simulating a satellite mission operating state according to the present invention includes: registering a satellite operation procedure rule which defines a satellite operation procedure keyword and attribute corresponding to a satellite's state of performing a mission of interest; receiving a satellite operation procedure which includes a series of operation procedures prepared for the satellite to perform the mission; extracting, from the received satellite operation procedure, a keyword and attribute value corresponding to the keyword and attribute included in the registered satellite operation procedure rule; storing a list of mission performance actions arranged in the order of execution time, in which the mission performance actions correspond to the extracted keyword and attribute value; and confirming an orbit and content of an action of interest corresponding to a current time from orbit data of the satellite and a list of actions of interest, and causing the satellite's state of performing a mission of interest to be visually displayed.

The method may further include: registering a satellite command rule which defines a satellite command keyword and attribute corresponding to the satellite's state of performing the mission of interest; and receiving a command corresponding to mission performance of the satellite, and extracting, from the received command, a keyword and attribute value corresponding to the keyword and attribute included in the registered satellite command rule.

A computer-readable recording medium may also be provided, storing a program for executing the method described above on a computer.

Advantageous Effects

According to the present invention, it is advantageous because it is possible to simulate only the major mission operating states of the satellite, which enables implementation with relatively less efforts and costs, and simple applications for several satellites. Further, there is an advantage that it is possible to intuitively check the major mission operating states of the satellite through the three-dimensional display screen.

DETAILED DESCRIPTION

Hereinafter, the exemplary embodiments of the present invention will be described in detail with reference to the accompanying drawings for those with ordinary knowledge in the art to be able to easily achieve the present invention.

Figure 1:
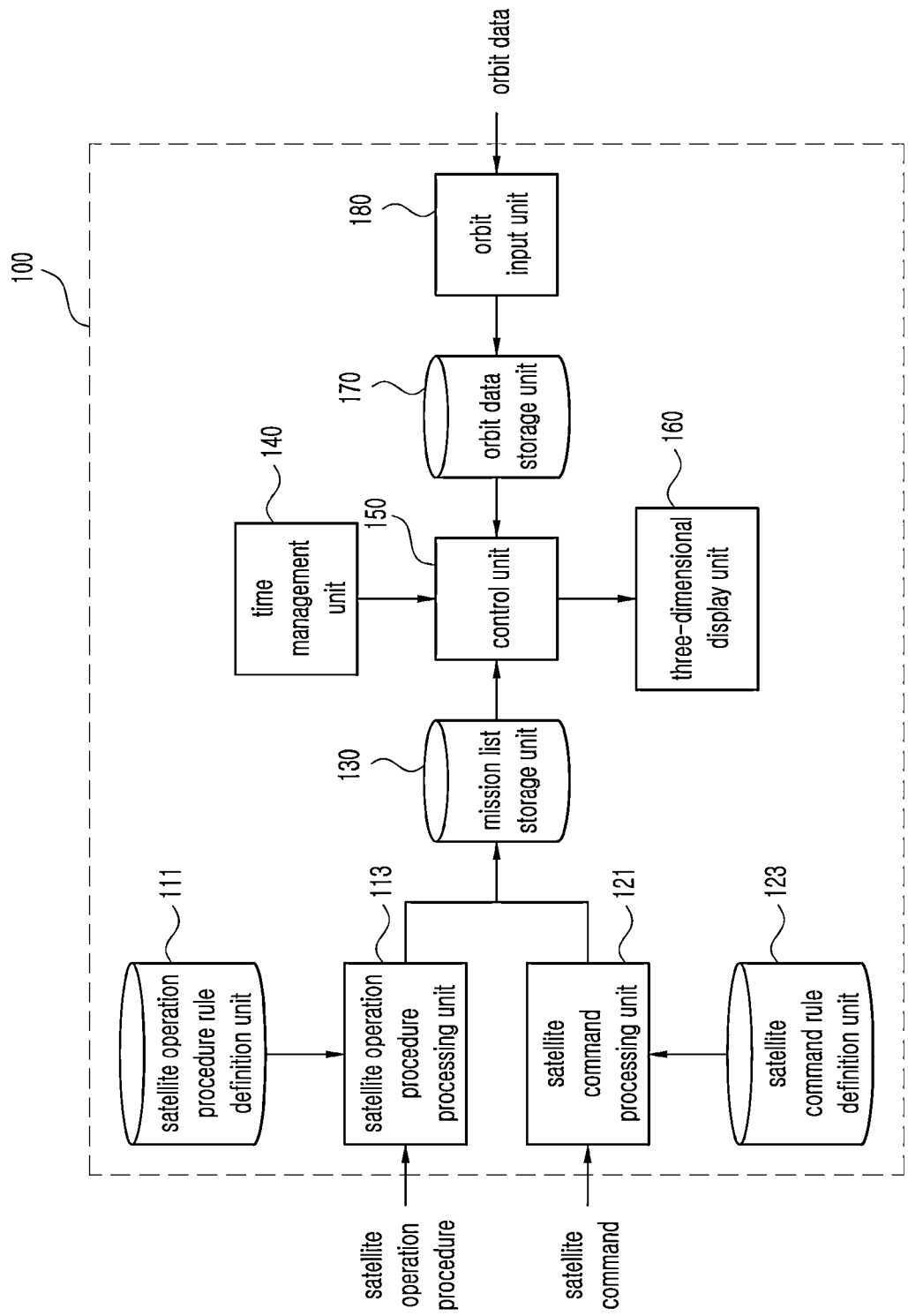
FIG. 1 is a block diagram illustrating a configuration of an apparatus for simulating a satellite mission operating state according to an embodiment of the present invention.

FIG. 1 is a block diagram illustrating a configuration of an apparatus for simulating a satellite mission operating state according to an embodiment of the present invention.

Referring to FIG. 1, the apparatus 100 for simulating a satellite mission operating state according to the present invention may include a satellite operation procedure rule definition unit 111, a satellite operation procedure processing unit 113, a satellite command processing unit 121, a satellite command rule definition unit 123, a mission list storage unit 130, a time management unit 140, a control unit 150, a three-dimensional display unit 160, an orbit data storage unit 170, and an orbit input unit 180.

Generally, the satellites perform a mission such as communication, attitude slewing, data acquisition, data transmission, or the like according to predetermined command procedures. The "satellite operation procedure" herein is prepared by including an operation procedure provided to perform a mission of the satellite.

The satellite operation procedure rule definition unit 111 may register the satellite operation procedure rule from an operator, in which the satellite operation procedure rule may define a satellite operation procedure keyword and attribute corresponding to the satellite's state of performing a mission of interest. For example, when "imaging" is the mission of interest, the operator may register, in the satellite operation procedure rule definition unit 111, a satellite operation procedure rule which defines a keyword and attribute corresponding to imaging. In more detail, when a keyword "AA" corresponds to imaging and there are "imaging start time" and "duration time" as the attribute corresponding to the keyword "AA", the satellite operation procedure rule definition unit 111 may register the satellite operation procedure rule that defines "AA", and "imaging start time" and "duration time". In addition, in order to check the state of an attitude of the satellite when performing the imaging mission, a satellite operation procedure rule defining a keyword "BB" corresponding to the attitude and the attribute "attitude angle" relating thereto may be automatically registered. Of course, the satellite operation procedure rules relating to the attitude may also be manually registered by the operator.

The satellite operation procedure processing unit 113 may receive a satellite operation procedure which includes a series of operation procedures prepared for the satellite to perform the mission, and extract, from the received satellite operation procedure, a keyword and attribute value corresponding to the keyword and attribute included in the registered satellite operation procedure rule. The satellite operation procedure may be transmitted from a mission planning unit (not shown) to the satellite operation procedure processing unit 113.

An example of extracting the keywords and the attribute values corresponding to the keywords and the attributes included in the satellite operation procedure rules in the satellite operation procedure processing unit 113 will be described with reference to Tables 1 and 2 below. The satellite operation procedure keywords may be an ASCII code.

TABLE 1

| Order of Satellite Operation Procedure | Satellite Operation Procedure |
| --- | --- |
| 1 | CC(arg1 = 10, arg = 2) |
| 2 | DD(arg1 = 10, arg = 2) |
| 3 | AA(arg1 = 10, arg = 2) |
| 4 | BB(arg1 = 30) |

TABLE 2

| Order of Satellite Operation Procedure | Satellite Operation Procedure | Pattern Recognition | Attribute Check |
| --- | --- | --- | --- |
| 1 | CC(arg1 = 10, arg = 2) | x | X |
| 2 | DD(arg1 = 10, arg = 2) | x | X |
| 3 | AA(arg1 = 10, arg = 2) | AA | Imaging Start Time = 10, Duration Time = 2 |
| 4 | BB(arg1 = 30) | BB | Attitude Angle = 30 |

For example, in a state that the keyword "AA" and the attributes "Imaging Start time" and "Duration Time" relating thereto, and the keyword "BB" and the attitude "Attitude Angle" relating thereto are defined in the satellite operation procedure rules, when the satellite operation procedure as illustrated in Table 1 is input, as illustrated in Table 2, the satellite operation procedure processing unit 113 may extract, through pattern recognition, the keyword "AA" and extract the attribute values "10" and "2" relating thereto from the satellite operation procedure. Likewise, the keyword "BB" and the attribute value "30" relating thereto may be extracted. The satellite command rule definition unit 123 may register a satellite command rule from the operator, in which the satellite command rule may define a satellite command keyword and attribute corresponding to the satellite's state of performing the mission of interest. For example, when "imaging" is the mission of interest, the operator may register, in the satellite command rule definition unit 123, a satellite command that defines the keyword and attribute corresponding to imaging. More specifically, the satellite command rule defining a position of the satellite command keyword "0xABCD" corresponding to imaging and the attribute value corresponding to the corresponding attribute such as "Imaging Start Time" and "Duration Time", may be registered. In addition, the satellite command rule defining the positions of the satellite command keyword "0xDCBA" and of the attribute "Attitude Angle" on the command may be automatically registered such that the state of the attitude of the satellite when performing an imaging mission can be checked. Of course, the satellite command rule relating to the attitude may also be manually registered by the operator. The satellite command keyword herein may be a HEXA code.

The satellite command processing unit 121 may receive a command corresponding to mission performance of the satellite from the command transmission unit (not shown) in real time, and extract, from the received command, a keyword and attribute value corresponding to the keyword and attribute included in the registered satellite command rule.

In a state that the satellite command rule exemplified above is registered, when the commands are transmitted in the order shown in Table 3 below, the satellite command processing unit 121 may pattern-recognize the command keywords registered in the transmitted commands and extract the attribute values from the command positions corresponding to the registered attributes.

TABLE 3

| Order of Transmitted Command | Transmitted Command | Pattern Recognition | Attribute Check |
|---|---|---|---|
| 1 | 0x1234FF112345667 | x | X |
| 2 | 0xABCCFF112345123 | x | X |
| 3 | 0xABCDFF11234A0B0 | 0xABCDFF11234A0B0 | 0xABCDFF11234A0B0 |
| 4 | 0xDCBAFF11C0 | 0xDCBAFF11C0 | 0xDCBAFF11C0 |

In Table 3, the transmitted commands including "0xABCD" and "0xDCBA" may be identified through pattern recognition, and the attribute values "A0", "B0" and "C0" may be extracted from the predefined positions of the commands. In Table 3, by way of example, "A0" indicates the attribute value of "Imaging Start Time", and "B0" indicates the attribute value of "Duration Time". The mission list storage unit 130 may store a list of mission performance actions arranged in the order of execution time, as illustrated below, in which the mission performance actions correspond to the keywords and attribute values extracted from the satellite operation procedure processing unit 113 and the satellite command processing unit 121.

The orbit input unit 180 may receive orbit data obtained in advance about the orbit of the satellite to be simulated from an external device (not shown).

The orbit data storage unit 170 may receive and store the orbit data of the satellite to be simulated from the orbit input unit 180. In an example, the orbit data includes the position of the satellite over time. For example, as illustrated in Table 4 below, the orbit data may be stored in the form of time (year, month, day, hour, minute, second), and position of the satellite on a rectangular coordinate system (three-dimensional X-Y-Z values).

TABLE 4

| Time (Year, Month, Day, Hour, Minute, Second) | X(km) | Y(km) | Z(km) |
|---|---|---|---|
| 20090124000000.000 | −6461.90568 | 2760.46055 | 795.63448 |
| 20090124000001.000 | −6460.51642 | 2761.57653 | 803.01763 |
| 20090124000002.000 | −6459.11974 | 2762.68920 | 810.39988 |

The time management unit 140 may provide a reference time according to a mode set by the control unit 150 as the current time. For example, in the real time mode, the time management unit 140 provides the time information that is same as the time of the computer (PC) installed, and in the non-real time mode, provides the time information based on the time set by the user. In addition, in the non-real time mode, the time information may also be provided at a predetermined increment speed as set by the user. Meanwhile, it is also possible to stop or re-start the progress of the reference time according to the controlling by the user, while providing the current time accordingly. The control unit 150 controls the overall operation of the apparatus 100 for simulating a satellite mission operating state. In particular, the control unit 150 may confirm the orbit and the mission performance action corresponding to the current time from the orbit data of the satellite and the mission list, and cause the satellite's state of performing a mission of interest to be visually displayed through the three-dimensional display unit 160.

The three-dimensional display unit 160 may be a display device such as a monitor or the like, and display a satellite's state of performing the mission of interest on a three-dimensional screen under the control of the control unit 150.

Figure 2:
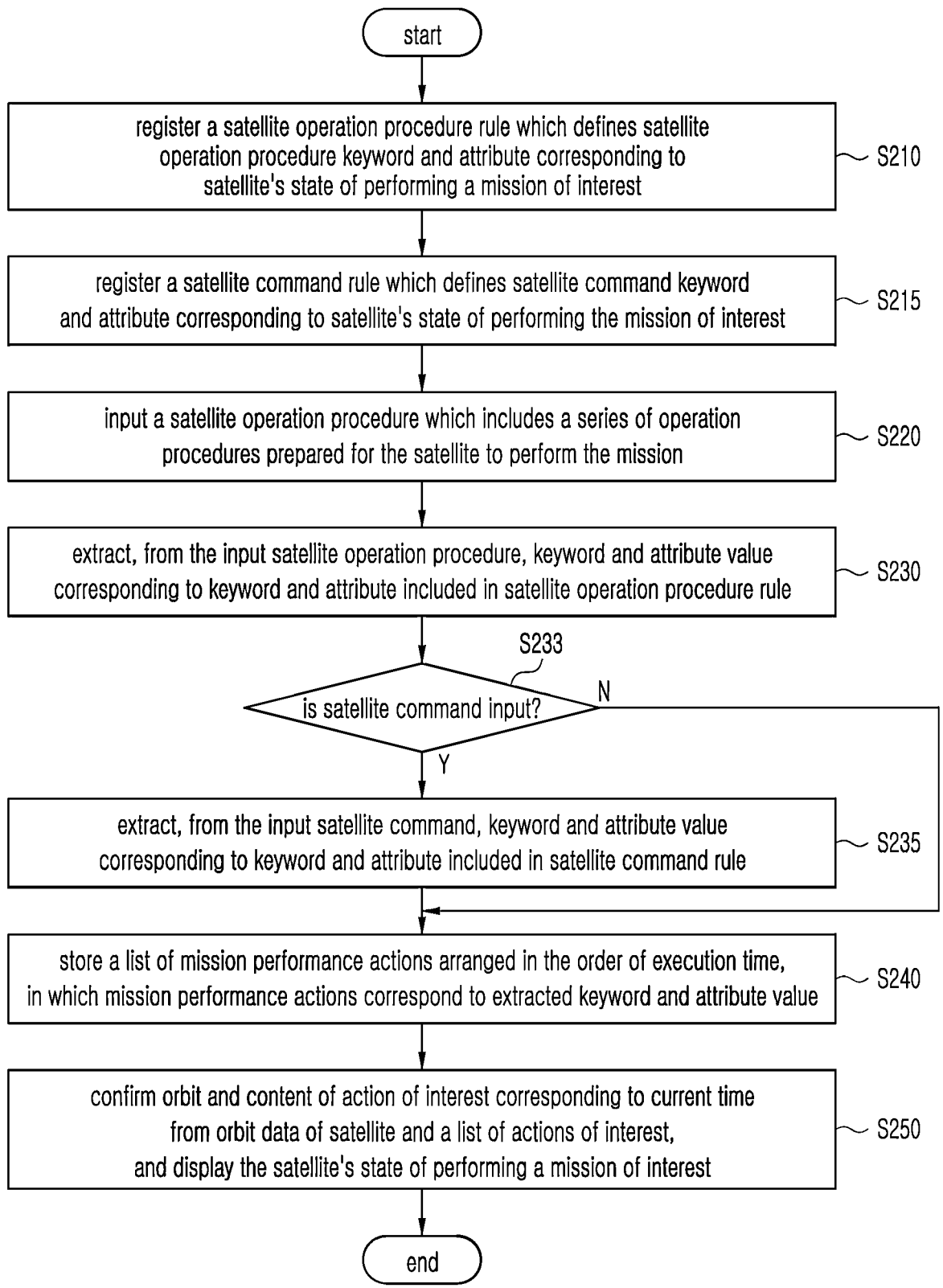
FIG. 2 is a flowchart provided to explain an operation of an apparatus for simulating a satellite mission operating state according to an embodiment of the present invention.

FIG. 2 is a flowchart provided to explain an operation of an apparatus for simulating a satellite mission operating state according to an embodiment of the present invention.

Referring to FIG. 2, first, the satellite operation procedure rule definition unit 111 may register a satellite operation procedure rule from the operator, in which the satellite operation procedure rule may define a satellite operation procedure keyword and attribute corresponding to the satellite's state of performing the mission of interest (S210).

Meanwhile, the satellite command rule definition unit 123 may register a satellite command rule from the operator, in which the satellite command rule may define a satellite command keyword and attribute corresponding to the satellite's state of performing the mission of interest (S215).

Next, the satellite operation procedure processing unit 113 may receive a satellite operation procedure which includes a series of operation procedures prepared for the satellite to perform the mission (S220), and extract, from the received satellite operation procedure, a keyword and attribute value corresponding to the keyword and attribute included in the registered satellite operation procedure rule (S230).

The mission list storage unit 130 may store a list of mission performance actions arranged in the order of execution time, in which the mission performance actions correspond to the keyword and attribute values extracted in S230 (S240).

In addition, the control unit 150 may confirm the orbit and the mission performance action corresponding to the current time from the orbit data of the satellite stored in advance and the mission-of-interest performance action list, and cause the satellite's state of performing the mission of interest to be visually displayed through the three-dimensional display unit 160 (S250).

Meanwhile, when the satellite command is transmitted and input before S240 or S250, or when the satellite command is transmitted and input during the performance in S250 (S233—Y), the satellite command processing unit 121 may extract, from the command input in real time, the keyword and attribute value corresponding to the keyword and attribute included in the registered satellite command rule (S235), and based on the extracted keyword and attribute value, add the mission performance action of the satellite according to the satellite command to the mission performance action list (S240), and cause the operation in S250 to be performed. Accordingly, it is possible to input and transmit the satellite command in real time and reflect it even during the simulation of the satellite mission operating state.

Figure 3:
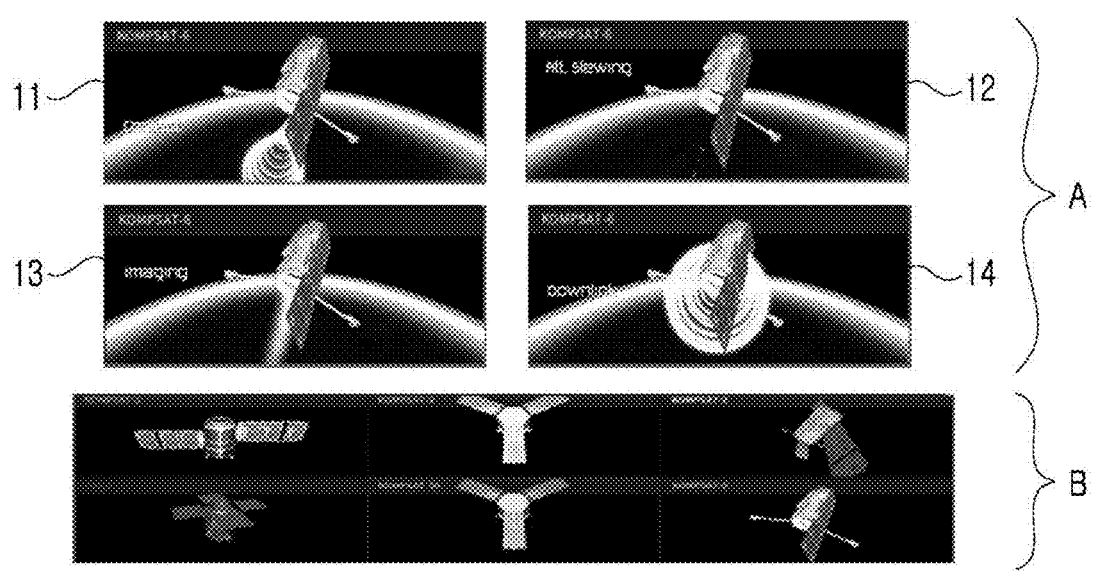
FIG. 3 is a diagram illustrating the satellite mission operating states displayed in three dimensions according to an embodiment of the present invention.

FIG. 3 is a diagram illustrating the satellite mission operating states displayed in three dimensions according to an embodiment of the present invention.

Referring to FIG. 3, as shown on the upper side A, a three-dimensional display screen prepared in advance, such as communication (contact) 11, attitude slewing 12, data acquisition (imaging) 13, data transmission (downlink) 14, or the like may be displayed according to the satellite mission operating state. In addition, as shown on the lower side B, it is possible to replace only the three-dimensional display screen prepared in advance for each of the satellites to be simulated and apply the same.

The embodiments of the present invention include a computer-readable medium including program instructions for performing various computer implemented operations. The medium records a program for executing the methods described above. The medium may include program instructions, data files, data structures, and so on, either alone or in combination. Examples of such medium include a magnetic medium such as hard disk, floppy disk and magnetic tape, an optical recording medium such as CD and DVD, a magneto-optical medium, and a hardware device configured to store and carry out program instructions, such as ROM, RAM, flash memory, and so on. Examples of program instructions include high-level language codes that may be executed by a computer using an interpreter, and so on as well as machine language codes such as those generated by a compiler.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A method for simulating a satellite mission operating state, comprising:
    registering a satellite operation procedure rule which defines a satellite operation procedure keyword and attribute corresponding to a satellite's state of performing a mission of interest;
    receiving a satellite operation procedure which includes a series of operation procedures prepared for the satellite to perform the mission;
    extracting, from the received satellite operation procedure, a keyword and attribute value corresponding to the keyword and attribute included in the registered satellite operation procedure rule;
    storing a list of mission performance actions arranged in an order of execution time, wherein the mission performance actions correspond to the extracted keyword and attribute value; and
    confirming an orbit and content of an action of interest corresponding to a current time from orbit data of the satellite and the list of mission performance actions, and causing the satellite's state of performing a mission of interest to be visually displayed,
    wherein the causing the satellite's state of performing a mission of interest to be visually displayed includes displaying, in real time, at least one of communication, attitude slewing, data acquisition or data transmission.

2. The method according to claim 1, further comprising:
    registering a satellite command rule which defines a satellite command keyword and attribute corresponding to the satellite's state of performing the mission of interest; and
    receiving a command corresponding to mission performance of the satellite, and extracting, from the received command, a keyword and attribute value corresponding to the keyword and attribute included in the registered satellite command rule.

3. The method according to claim 2, wherein the satellite operation procedure keyword is an ASCII code, and the satellite command keyword is an HEXA code.

4. A non-transitory computer-readable recording medium storing a program for executing the method of claim 1 on a computer.

5. A non-transitory computer-readable recording medium storing a program for executing the method of claim 2 on a computer.

6. The non-transitory computer-readable recording medium according to claim 5, wherein the satellite operation procedure keyword is an ASCII code, and the satellite command keyword is an HEXA code.

* * * * *